United States Patent
Lin et al.

(10) Patent No.: US 8,430,552 B2
(45) Date of Patent: Apr. 30, 2013

(54) LIGHT GUIDING PLATE WITH CURVED REFLECTING MICROSTRUCTURES

(75) Inventors: Hao-Xiang Lin, Jiaoxi Township, Yilan County (TW); Wen-Feng Cheng, New Taipei (TW); Yan Zuo Chen, Taoyuan (TW); Jui-Hsiang Chang, Taipei (TW)

(73) Assignee: Entire Technology Co., Ltd., Pingjhen (TW)

( * ) Notice: Subject to any disclaimer, the term of this patent is extended or adjusted under 35 U.S.C. 154(b) by 242 days.

(21) Appl. No.: 13/096,547

(22) Filed: Apr. 28, 2011

(65) Prior Publication Data
US 2012/0195067 A1 Aug. 2, 2012

(30) Foreign Application Priority Data
Feb. 1, 2011 (TW) .............................. 100103929 A

(51) Int. Cl.
*F21V 7/09* (2006.01)
(52) U.S. Cl.
USPC ........... 362/626; 362/615; 362/625; 362/511; 349/65

(58) Field of Classification Search ............... 362/23.09, 362/23.14, 615, 617, 619, 623, 625, 626, 362/627; 349/62, 65
See application file for complete search history.

(56) References Cited

U.S. PATENT DOCUMENTS
5,838,403 A 11/1998 Jannson et al.

*Primary Examiner* — Ismael Negron
(74) *Attorney, Agent, or Firm* — C. G. Mersereau; Nikolai & Mersereau, P.A.

(57) ABSTRACT

The main body of the main unit has a light-receiving surface, a light-reflecting surface, and a light-projecting surface. The reflecting unit includes a plurality of reflecting microstructures formed on the light-reflecting surface. Each reflecting microstructure has a first reflecting curved surface, and the first reflecting curved surface of each reflecting microstructure has a first reflecting curved line shown on the lateral surface thereof. The first reflecting curved line of each first reflecting curved surface is substantially composed of a first base point as an initial point on the first bottom portion of the light-reflecting surface, a second base point as an end point on the second bottom portion of the light-reflecting surface, and a first curve track connected from the first base point to the second base point and passing through a plurality of first trajectory points.

20 Claims, 14 Drawing Sheets

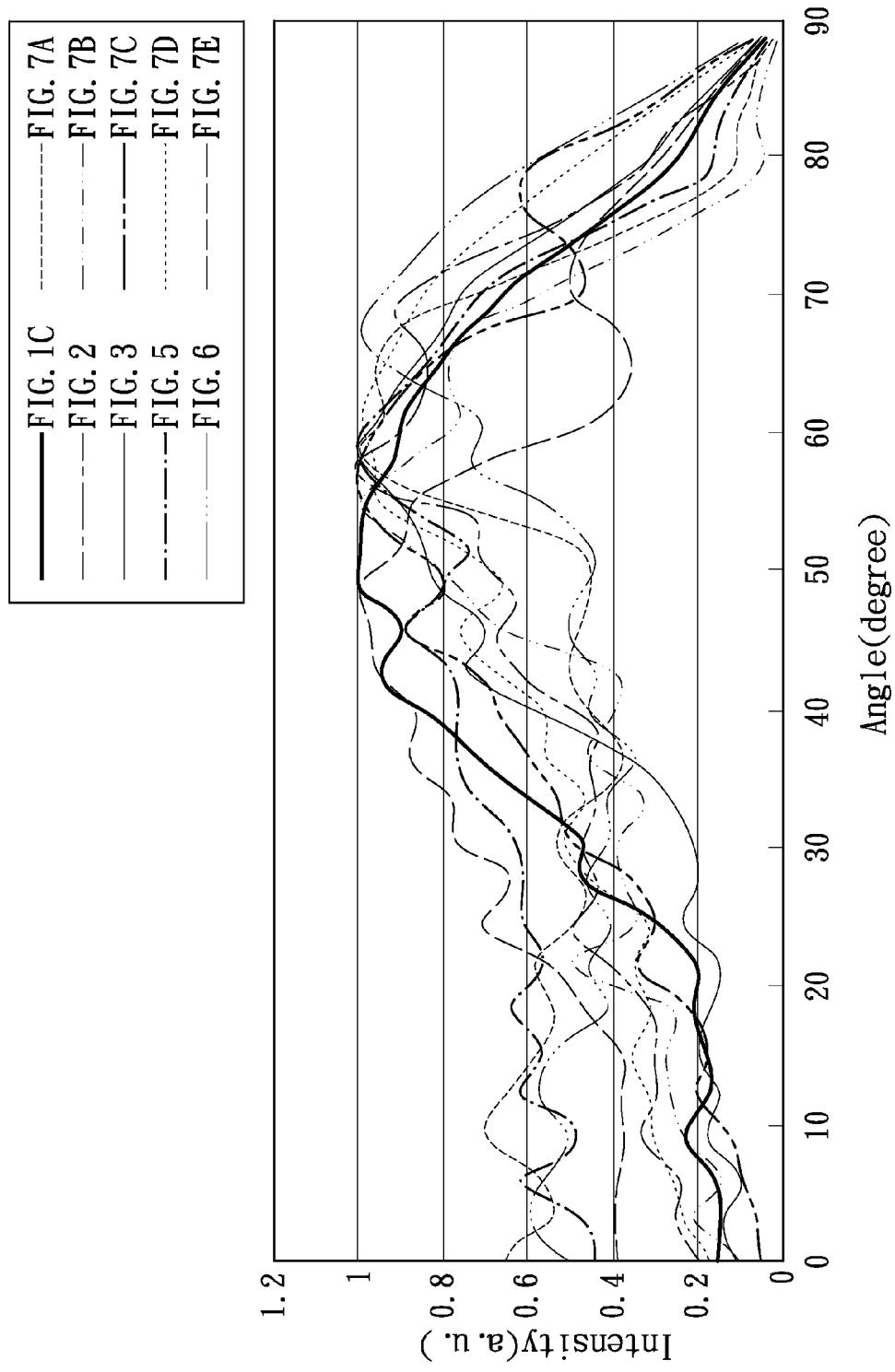

LIGHT GUIDING PLATE WITH CURVED REFLECTING MICROSTRUCTURES

BACKGROUND OF THE INVENTION

1. Field of the Invention

The instant disclosure relates to a light-guiding plate and a backlight module, and more particularly, to a light-guiding plate and a backlight module for increasing the light-guiding efficiency and the light usage rate of the positive light source.

2. Description of Related Art

Among all kinds of flat display devices, a liquid crystal display (LCD) device with low electrical power consumption, low voltage operation, thinner thickness and lighter weight, is widely used in nowadays. A liquid crystal display device typically includes a first substrate having common electrodes and a color filter, and a second substrate having thin film transistors and pixel electrodes. The first substrate and the second substrate are provided substantially in parallel with a predetermined gap therebetween, and liquid crystal is injected between the two opposing substrates. An electric field is formed between the substrates by applying different voltages to the pixel electrodes and common electrodes. Accordingly, the alignment of liquid crystal molecules of the liquid crystal material is varied to thereby control the transmittance of incident light. The visions of liquid crystal display devices are extremely excellent since the displayed figures or pictures are not offensive to the eyes of human being unlike light emitting diode. But it is one of the drawbacks of LCD that an additional light module is needed in order to show figures or pictures on the screen under the dark circumstance because LCD does not have the character of light-emitting itself.

In the prior art, U.S. Pat. No. 5,838,403 discloses a backlight module using at least two light-guiding plates and at least one light-converging sheet mated with each other. In general, the light-projecting direction of the light source can be adjusted by the prism structures formed on the bottom portion of the light-guiding plate. However, the light usage rate of the positive light source can not be effectively increased by using the prism structures, where the positive light source is a projection light substantially vertical to the light-guiding plate.

SUMMARY OF THE INVENTION

One particular aspect of the instant disclosure is to provide a light-guiding plate and a backlight module for increasing the light-guiding efficiency and the light usage rate of the positive light source without using any optical film and dual-layer light-guiding plate.

One of the embodiments of the instant disclosure provides a light-guiding plate, comprising: a main unit and a reflecting unit. The main unit includes at least one main body, wherein the main body has a light-receiving surface, a light-reflecting surface, and a light-projecting surface, the light-receiving surface connects to the light-reflecting surface and the light-projecting surface, the light-reflecting surface corresponds to the light-projecting surface, and the light-reflecting surface has a first bottom portion and a second bottom portion separated from the first bottom portion by a predetermined height. The reflecting unit includes a plurality of reflecting microstructures formed on the light-reflecting surface of the main body, wherein each reflecting microstructure has a first reflecting curved surface, and the first reflecting curved surface of each reflecting microstructure has a first reflecting curved line shown on the lateral surface thereof. In addition, the first reflecting curved line of each first reflecting curved surface is substantially composed of a first base point ($P_1$) as an initial point on the first bottom portion of the light-reflecting surface, a second base point ($P_2$) as an end point on the second bottom portion of the light-reflecting surface, and a first curve track connected from the first base point ($P_1$) to the second base point ($P_2$) and passing through a plurality of first trajectory points ($P_{V1}$), wherein the first reflecting curved line of each first reflecting curved surface has a first control point ($P_{C1}$) separated from the first base point ($P_1$) by a first predetermined distance and from the second base point ($P_2$) by a second predetermined distance, and the first curve track of the first reflecting curved line of each first reflecting curved surface is disposed within a triangular area surrounded by the first base point ($P_1$), the second base point ($P_2$), and the first control point ($P_{C1}$). The relationship among $\overrightarrow{P_1P_{V1}}$, $\overrightarrow{P_1P_{C1}}$, and $\overrightarrow{P_1P_2}$ for the first reflecting curved line of each first reflecting curved surface conforms to the following formula:

$$\overrightarrow{P_1P_{V1}} = \left[\frac{2AV(1-V)}{1+2(A-1)V+2(1-A)V^2}\right]$$
$$\overrightarrow{P_1P_{C1}} + \left[\frac{V^2}{1+2(A-1)V+2(1-A)V^2}\right]\overrightarrow{P_1P_2},$$

wherein the label A is defined as a weighting factor substantially between 0.1 and 10, and the label V is defined as a parameter substantially between 0 and 1.

Therefore, the light-guiding efficiency and the light usage rate of the positive light source can be effectively increased due to the design of the reflecting microstructures formed on the light-reflecting surface of the main body.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

BRIEF DESCRIPTION OF THE DRAWINGS

FIG. 9 shows a light shape curve diagram of different light-projecting angles versus different light-projecting intensities according to different light-guiding plates in FIGS. 1C, 2B, 3, 5, 6, and 7A-7E of the instant disclosure.

DETAILED DESCRIPTION OF THE PREFERRED EMBODIMENTS

First Embodiment

Figure 1A:
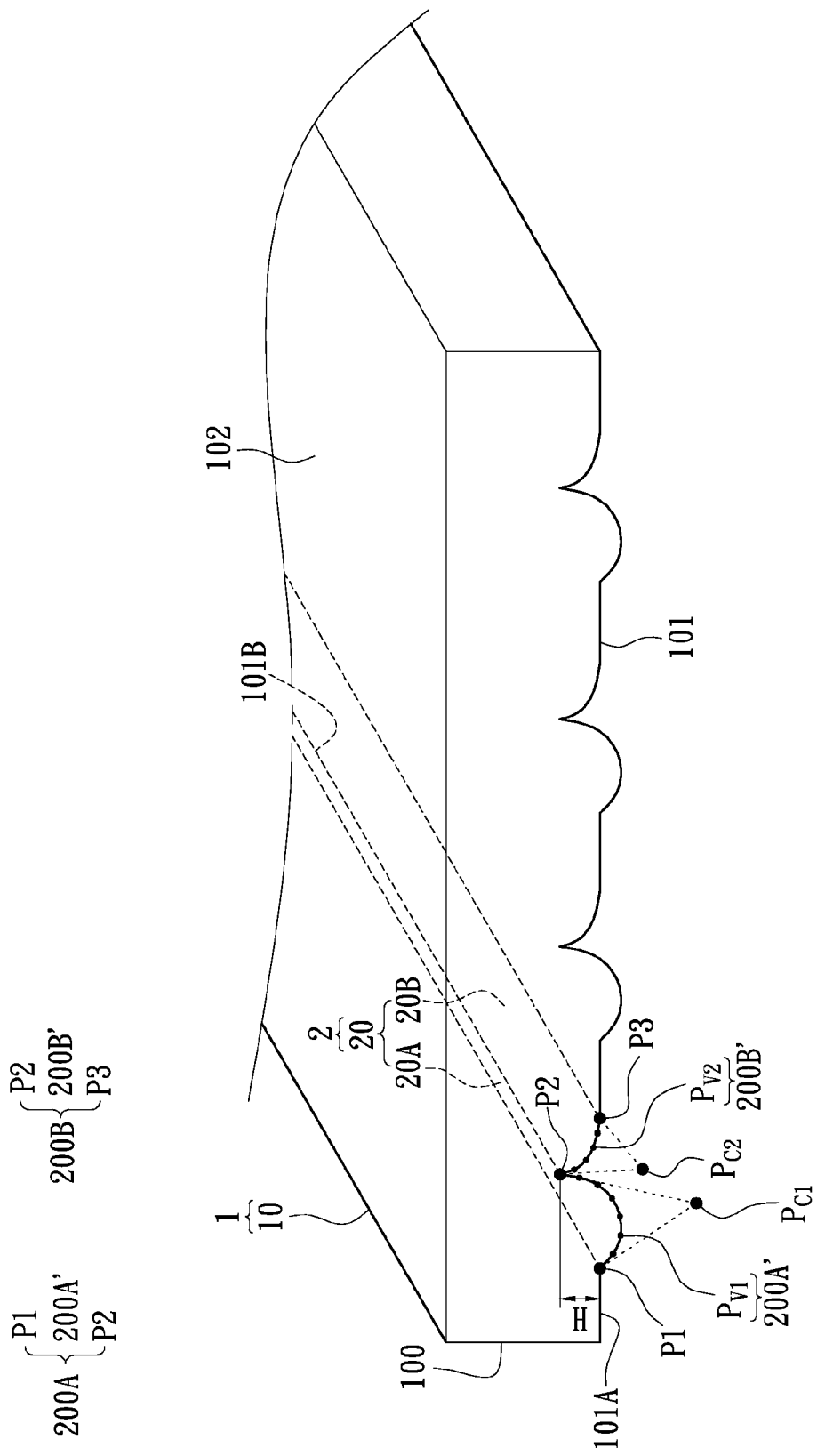
FIG. 1A shows a partial, perspective, schematic view of the light-guiding plate according to the first embodiment of the instant disclosure.
Figure 1B:
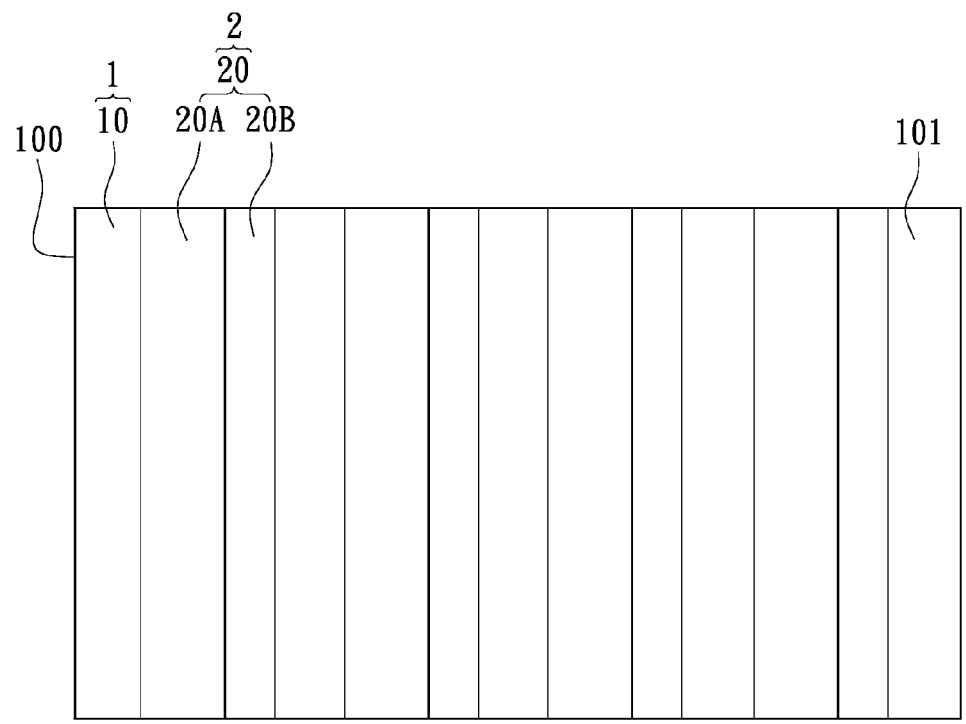
FIG. 1B shows a bottom, schematic view of the light-guiding plate according to the first embodiment of the instant disclosure.
Figure 1C:
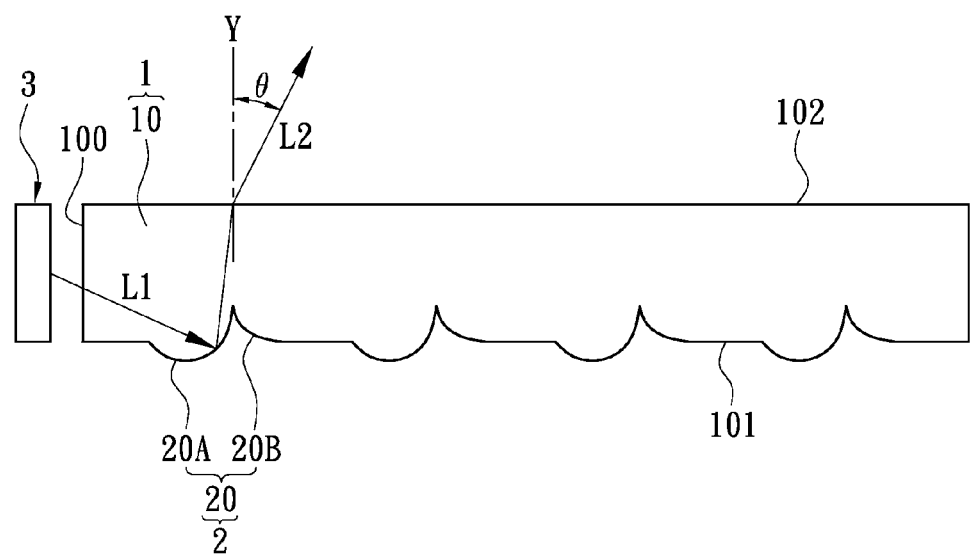
FIG. 1C shows a lateral, schematic view of the light-guiding plate using a light-emitting unit according to the first embodiment of the instant disclosure.

Referring to FIGS. 1A to 1C, the first embodiment of the instant disclosure provides a light-guiding plate, comprising a main unit 1 and a reflecting unit 2.

The main unit 1 includes at least one main body 10, and the main body 10 has a light-receiving surface 100, a light-reflecting surface 101, and a light-projecting surface 102. The light-receiving surface 100 connects to the light-reflecting surface 101 and the light-projecting surface 102, the light-reflecting surface 101 corresponds to the light-projecting surface 102, and the light-reflecting surface 101 has a first bottom portion 101A and a second bottom portion 101B separated from the first bottom portion 101A by a predetermined height H. For example, the main body 10 may be a light-permitting body or a transparent body, the light-receiving surface 100 is formed on one lateral side of the light-permitting body, and the light-reflecting surface 101 and the light-projecting surface 102 are respectively formed on a bottom side and a top side of the light-permitting body.

Moreover, the reflecting unit 2 includes a plurality of reflecting microstructures 20 formed on the light-reflecting surface 101 of the main body 10. Each reflecting microstructure 20 has a first reflecting curved surface 20A and a second reflecting curved surface 20B. The first reflecting curved surface 20A of each reflecting microstructure 20 has a first reflecting curved line 200A shown on the lateral surface thereof, and the second reflecting curved surface 20B of each reflecting microstructure 20 has a second reflecting curved line 200B shown on the lateral surface thereof. For example, each reflecting microstructure 20 may be a continuous extending structure (as shown in FIGS. 1A and 1B), and the reflecting microstructures 20 may be integrally formed on the light-reflecting surface 101 of the at last one main body 10 in parallel.

Furthermore, the first reflecting curved line 200A of each first reflecting curved surface 20A is substantially composed of a first base point ($P_1$) as an initial point on the first bottom portion 101A of the light-reflecting surface 101, a second base point ($P_2$) as an end point on the second bottom portion 101B of the light-reflecting surface 101, and a first curve track 200A' connected from the first base point ($P_1$) to the second base point ($P_2$) and passing through a plurality of first trajectory points ($P_{V1}$). The first reflecting curved line 200A of each first reflecting curved surface 20A has a first control point ($P_{C1}$) separated from the first base point ($P_1$) by a first predetermined distance and from the second base point ($P_2$) by a second predetermined distance, and the first curve track 200A' of the first reflecting curved line 200A of each first reflecting curved surface 20A is disposed within a triangular area surrounded by the first base point ($P_1$), the second base point ($P_2$), and the first control point ($P_{C1}$). In addition, the relationship among $\overrightarrow{P_1P_{V1}}$, $\overrightarrow{P_1P_{C1}}$ and $\overrightarrow{P_1P_2}$ for the first reflecting curved line 200A of each first reflecting curved surface 20A can conform to the following formula:

$$\overrightarrow{P_1P_{V1}} = \left[\frac{2AV(1-V)}{1+2(A-1)V+2(1-A)V^2}\right]\overrightarrow{P_1P_{C1}} + \left[\frac{V^2}{1+2(A-1)V+2(1-A)V^2}\right]\overrightarrow{P_1P_2},$$

where the label A is defined as a weighting factor substantially between 0.1 and 10, and the label V is defined as a parameter substantially between 0 and 1.

For the first situation of the first embodiment, when a second curve track 200B' is an irregular track, the second reflecting curved line 200B is an irregular curved line and the second reflecting curved surface 20B is an irregular curved surface. For example, the second reflecting curved line 200B of each second reflecting curved surface 20B is substantially composed of the second base point ($P_2$) as an initial point on the second bottom portion 101B of the light-reflecting surface 101, a third base point ($P_3$) as an end point on the first bottom portion 101A of the light-reflecting surface 101, and a second curve track 200B' connected from the second base point ($P_2$) to the third base point ($P_3$) and passing through a plurality of second trajectory points ($P_{V2}$).

For the second situation of the first embodiment, when a second curve track 200B' is a regular track, the second reflecting curved line 200B is a regular curved line and the second reflecting curved surface 20B is a regular curved surface. For example, referring to FIG. 1A, the second reflecting curved line 200B of each second reflecting curved surface 20B has a second control point ($P_{C2}$) separated from the second base point ($P_2$) by a first predetermined distance and from the third base point ($P_3$) by a second predetermined distance, and the second curve track 200B' of the second reflecting curved line 200B of each second reflecting curved surface 20B is disposed within a triangular area surrounded by the second base point ($P_2$), the third base point ($P_3$), and the second control point ($P_{C2}$). In addition, the relationship among $\overrightarrow{P_3P_{V2}}$, $\overrightarrow{P_3P_{C2}}$, and $\overrightarrow{P_3P_2}$ for the second reflecting curved line 200B of each second reflecting curved surface 20B can conform to the following formula:

$$\overrightarrow{P_3P_{V2}} = \left[\frac{2AV(1-V)}{1+2(A-1)V+2(1-A)V^2}\right]$$
$$\overrightarrow{P_3P_{C2}} + \left[\frac{V^2}{1+2(A-1)V+2(1-A)V^2}\right]\overrightarrow{P_3P_2},$$

where the label A is defined as a weighting factor substantially between 0.1 and 10, and the label V is defined as a parameter substantially between 0 and 1.

Therefore, the second reflecting curved lines 200B of the second reflecting curved surfaces 20B are respectively connected to the first reflecting curved lines 200A of the first reflecting curved surfaces 20A, thus the second reflecting curved surfaces 20B are respectively connected to the first reflecting curved surfaces 20A. In other words, each reflecting microstructure 20 can be composed of the first reflecting curved surface 20A and the second reflecting curved surfaces 20B connected with the first reflecting curved surface 20A, and the second reflecting curved surface 20B can be an irregular curved surface or a regular curved surface (as shown in FIG. 1A).

Moreover, referring to FIG. 1C, the light-guiding plate of the instant disclosure can matched with a light-emitting unit 3 to form a backlight module. In other words, the backlight module can be substantially composed of a main unit 1, a reflecting unit 2, and a light-emitting unit 3, and the backlight module can be a light source for any type of electronic product. For example, when the light-emitting unit 3 is disposed adjacent to one lateral side of the main body 1 and facing the light-receiving surface 100 of the main body 1, the backlight module can be a side light type backlight module.

In addition, referring to FIG. 1C, the incident lights L1 (as the arrow shown in FIG. 1C) generated by the light-emitting unit 3 is reflected by each first reflecting curved surface 20A or each second reflecting curved surface 20B on the light-reflecting surface 101 to form the projection lights L2 projected upwardly from the light-projecting surface 102. Therefore, the projection angle θ of each projection light L2 relative to the vertical line Y can be minimized due to the design of the reflecting microstructures 20 on the light-reflecting surface 101 of the main body 10, thus the light-guiding efficiency and the light usage rate of the positive light source (the vertical and upward projection lights) can be increased.

Figure 1D:
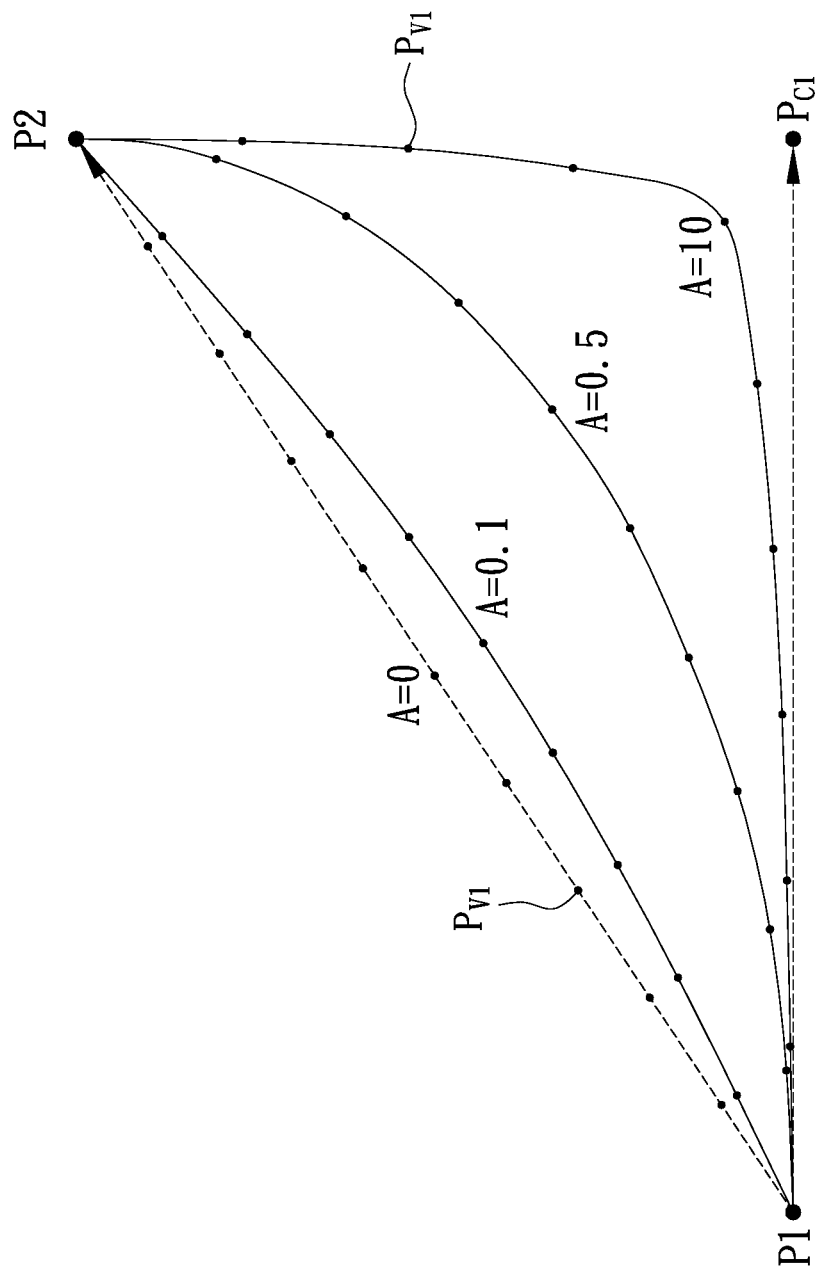
FIG. 1D shows a schematic diagram of different curved lines according to different weighting factors in the first embodiment of the instant disclosure.

Referring to FIG. 1D, where a schematic diagram of different curved lines according to different weighting factors is shown. When the weighting factor (A value) is increased gradually, the first trajectory points ($P_{V1}$) is close to the first control point ($P_{C1}$) gradually. Oppositely, when the weighting factor (A value) is decreased gradually, the first trajectory points ($P_{V1}$) is far away from the first control point ($P_{C1}$) gradually. When the weighting factor is zero (A=0), the straight line from the first base point ($P_1$) to the second base point ($P_2$) is a straight reflecting line.

Second Embodiment

Figure 2A:
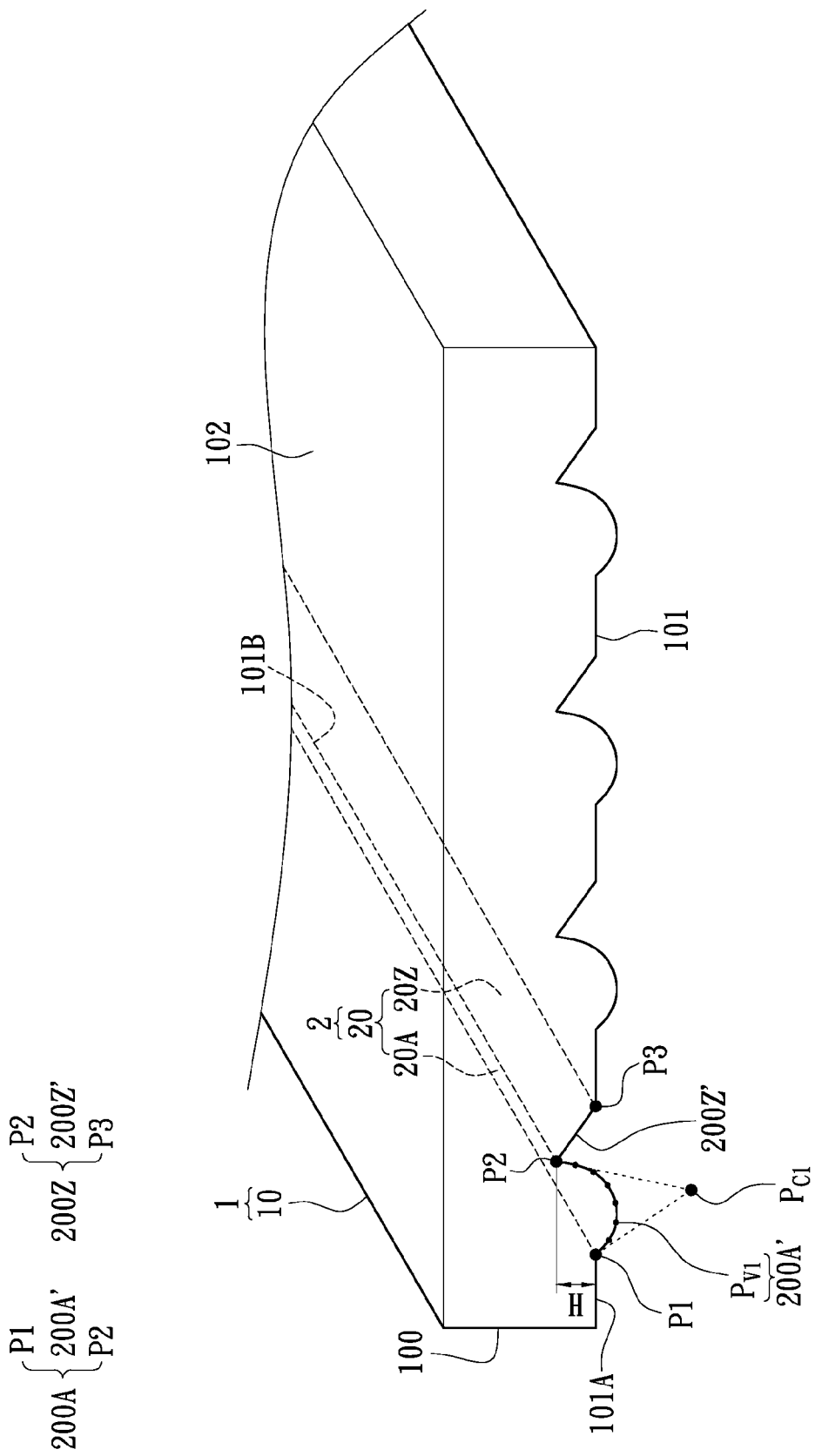
FIG. 2A shows a partial, perspective, schematic view of the light-guiding plate according to the second embodiment of the instant disclosure.
Figure 2B:
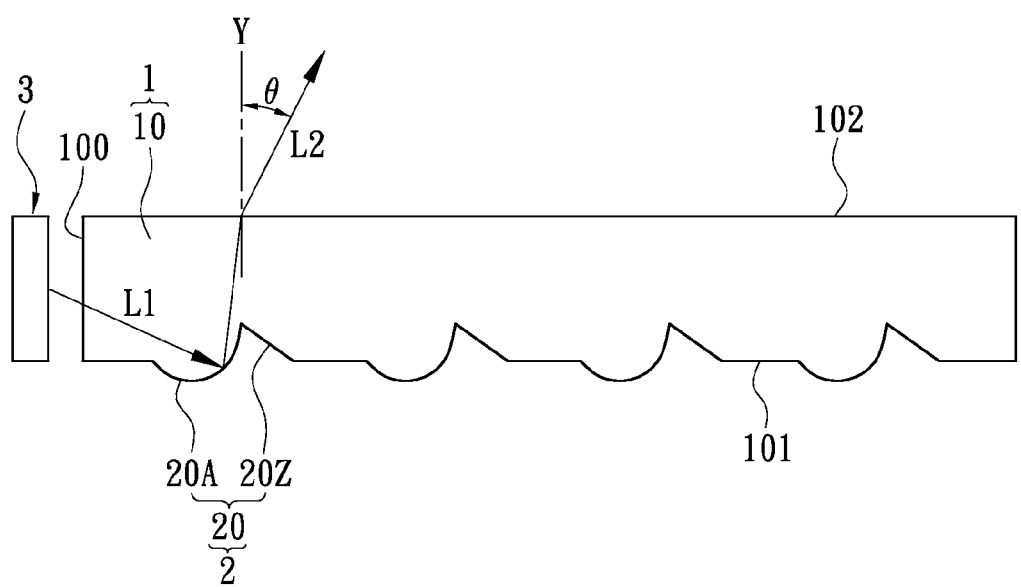
FIG. 2B shows a lateral, schematic view of the light-guiding plate using a light-emitting unit according to the second embodiment of the instant disclosure.

Referring to FIGS. 2A to 2B, the second embodiment of the instant disclosure provides a light-guiding plate. Comparing FIG. 2A with FIG. 1A, the different between the second embodiment and the first embodiment is that: in the second embodiment, each reflecting microstructure 20 has a reflecting plane surface 20Z, and the reflecting plane surface 20Z of each reflecting microstructure 20 has a reflecting straight line 200Z shown on the lateral surface thereof. The reflecting straight line 200Z of each reflecting plane surface 20Z is substantially composed of the second base point ($P_2$) as an initial point on the second bottom portion 101B of the light-reflecting surface 101, a third base point ($P_3$) as an end point on the first bottom portion 101A of the light-reflecting surface 101, and a straight line track 200Z' straightly connected from the second base point ($P_2$) to the third base point ($P_3$). In other words, the reflecting straight lines 200Z of the reflecting plane surfaces 20Z are respectively connected to the first reflecting curved lines 200A of the first reflecting curved surfaces 20A, thus the reflecting plane surfaces 20Z are respectively connected to the first reflecting curved surfaces 20A.

Figure 2C:
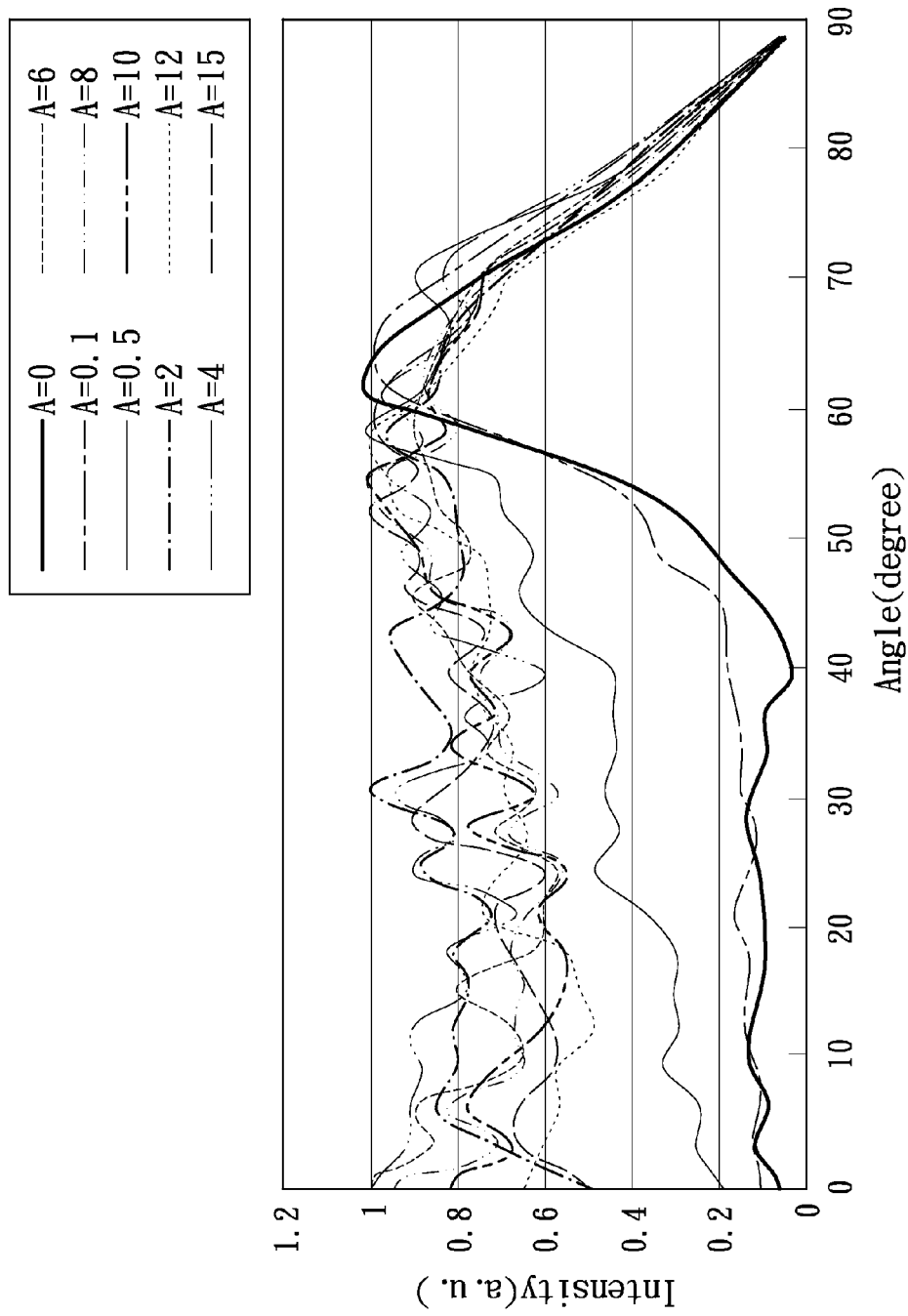
FIG. 2C shows a light shape curve diagram of different light-projecting angles versus different light-projecting intensities according to different weighting factors in the second embodiment of the instant disclosure.
Figure 2D:
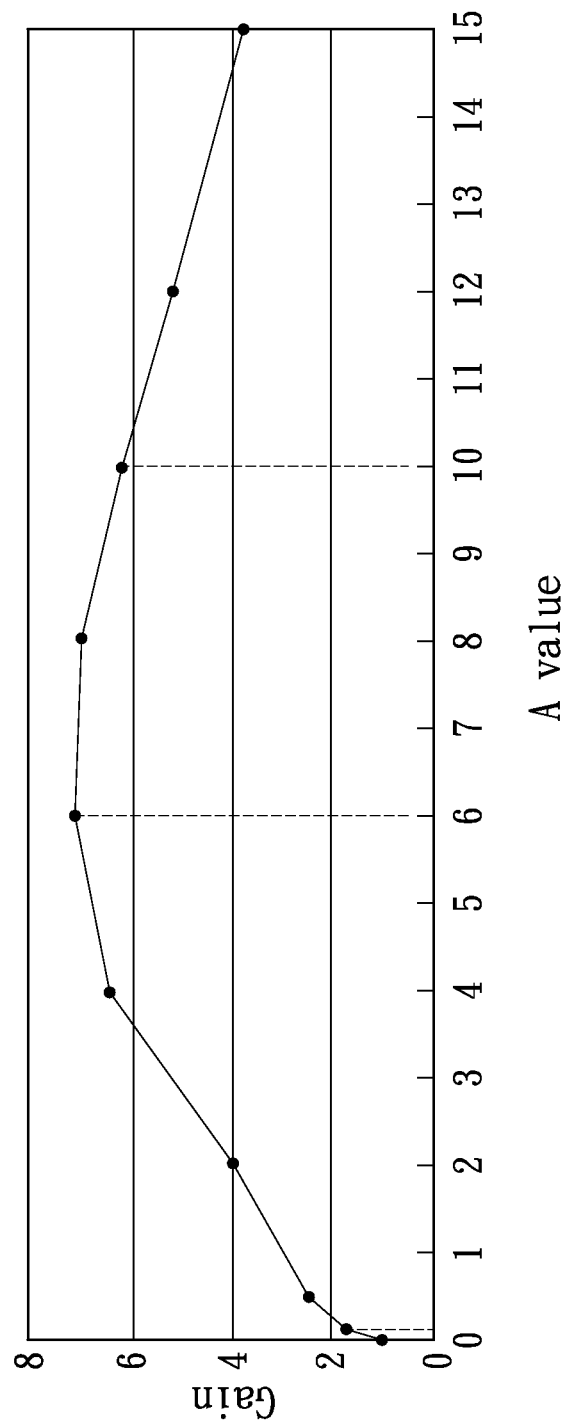
FIG. 2D shows a curve diagram of different weighting factors versus different gain values in the second embodiment of the instant disclosure.

Referring to FIGS. 2C and 2D, FIG. 2C shows a light shape curve diagram of different light-projecting angles versus different light-projecting intensities according to different weighting factors, and FIG. 2D shows a curve diagram of different weighting factors versus different gain values. Matching FIGS. 2B and 2C, when the optimum range of weighting factor (A value) is substantially between 0.1 and 10, the incident light L1 reflected by the first reflecting curved surfaces 20A to form the projection light L2 close to the positive light source (the positive projection angle θ of each projection light L2 relative to the vertical line Y can be minimized and close to zero) for increasing the light usage rate and the luminance. However, when the weighting factor is too large, each projection light L2 is guided toward another opposite direction to form the negative projection angle opposite to the positive projection angle θ, thus the light usage rate and the luminance is decreased. In addition, when the weighting factor is too large, a sharp structure is formed between the first reflecting curved surface 20A and the reflecting plane surface 20Z. It is easy to damage the sharp structure, and it is difficult to manufacture the sharp structure. Furthermore, referring to FIG. 2D, when the weighting factor is 6 (A=6), the gain value of the zero angle (A=6) in the instant disclosure is 7.1 times the value of the zero angle in the prior art (A=0).

Third Embodiment

Figure 3:
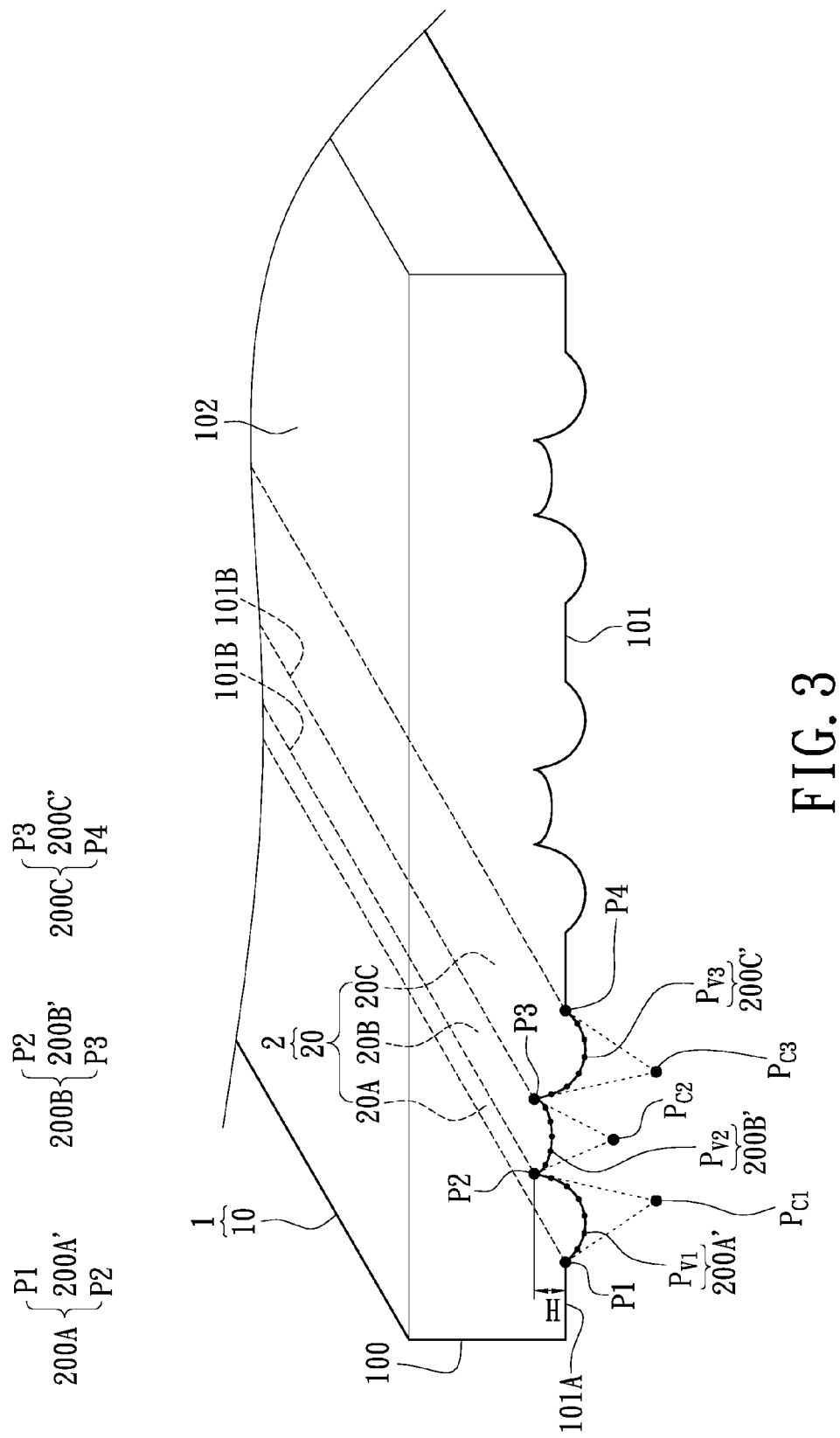
FIG. 3 shows a partial, perspective, schematic view of the light-guiding plate according to the third embodiment of the instant disclosure.

Referring to FIG. 3, the third embodiment of the instant disclosure provides a light-guiding plate. Comparing FIG. 3 with FIG. 1A, the different between the third embodiment and the first embodiment is that: in the third embodiment, each reflecting microstructure 20 has a third reflecting curved surface 20C, and the third reflecting curved surface 20C of each reflecting microstructure 20 has a third reflecting curved line 200C shown on the lateral surface thereof.

For the first situation of the third embodiment, when a second curve track 200B' and a third curve track 200C' are irregular tracks, the second reflecting curved line 200B and the third reflecting curved line 200C are irregular curved lines, and the second reflecting curved surface 20B and the third reflecting curved surface 20C are irregular curved surfaces. For example, the second reflecting curved line 200B of each second reflecting curved surface 20B is substantially composed of the second base point ($P_2$) as an initial point on the second bottom portion 101B of the light-reflecting surface 101, a third base point ($P_3$) as an end point on the second bottom portion 101B of the light-reflecting surface 101, and a second curve track 200B' connected from the second base point ($P_2$) to the third base point ($P_3$) and passing through a plurality of second trajectory points ($P_{V2}$). In addition, the third reflecting curved line 200C of each third reflecting curved surface 20C is substantially composed of the third base point ($P_3$) as an initial point on the second bottom portion 101B of the light-reflecting surface 101, a fourth base point ($P_4$) as an end point on the first bottom portion 101A of the light-reflecting surface 101, and a third curve track 200C' connected from the third base point ($P_3$) to the fourth base point ($P_4$) and passing through a plurality of third trajectory points ($P_{V3}$).

For the first situation of the third embodiment, when a second curve track 200B' and a third curve track 200C' are regular tracks, the second reflecting curved line 200B and the third reflecting curved line 200C are regular curved lines, and the second reflecting curved surface 20B and the third reflecting curved surface 20C are regular curved surfaces. For example, referring to FIG. 3, the second reflecting curved line 200B of each second reflecting curved surface 20B has a second control point ($P_{C2}$) separated from the second base point ($P_2$) by a first predetermined distance and from the third base point ($P_3$) by a second predetermined distance, and the second curve track 200B' of the second reflecting curved line 200B of each second reflecting curved surface 20B is disposed within a triangular area surrounded by the second base point ($P_2$), the third base point ($P_3$), and the second control point ($P_{C2}$). In addition, the relationship among $\overrightarrow{P_3P_{V2}}$, $\overrightarrow{P_3P_{C2}}$, and $\overrightarrow{P_3P_2}$ for the second reflecting curved line 200B of each second reflecting curved surface 20B can conform to the following formula:

$$\overrightarrow{P_3P_{V2}} = \left[\frac{2AV(1-V)}{1+2(A-1)V+2(1-A)V^2}\right]$$
$$\overrightarrow{P_3P_{C2}} + \left[\frac{V^2}{1+2(A-1)V+2(1-A)V^2}\right]\overrightarrow{P_3P_2},$$

where the label A is defined as a weighting factor substantially between 0.1 and 10, and the label V is defined as a parameter substantially between 0 and 1.

Furthermore, the third reflecting curved line 200C of each third reflecting curved surface 20C has a third control point ($P_{C3}$) separated from the third base point ($P_3$) by a first predetermined distance and from the fourth base point ($P_4$) by a second predetermined distance, and the third curve track 200C' of the third reflecting curved line 200C of each third reflecting curved surface 20C is disposed within a triangular area surrounded by the third base point ($P_3$), the fourth base point ($P_4$), and the third control point ($P_{C3}$). In addition, the relationship among $\overrightarrow{P_4P_{V3}}$, $\overrightarrow{P_4P_{C3}}$, and $\overrightarrow{P_4P_3}$ for the third reflecting curved line 200C of each third reflecting curved surface 20C can conform to the following formula:

$$\overrightarrow{P_4P_{V3}} = \left[\frac{2AV(1-V)}{1+2(A-1)V+2(1-A)V^2}\right]$$
$$\overrightarrow{P_4P_{C3}} + \left[\frac{V^2}{1+2(A-1)V+2(1-A)V^2}\right]\overrightarrow{P_4P_3},$$

where the label A is defined as a weighting factor substantially between 0.1 and 10, and the label V is defined as a parameter substantially between 0 and 1.

Therefore, wherein the second reflecting curved lines 200B of the second reflecting curved surfaces 20B are respectively connected to the first reflecting curved lines 200A of the first reflecting curved surfaces 20A, thus the second reflecting curved surfaces 20B are respectively connected to the first reflecting curved surfaces 20A. The third reflecting curved lines 200C of the third reflecting curved surfaces 20C are respectively connected to the second reflecting curved lines 200B of the second reflecting curved surfaces 20B, thus the third reflecting curved surfaces 20C are respectively connected to the second reflecting curved surfaces 20B. In other words, each reflecting microstructure 20 can be composed of the first reflecting curved surface 20A, the second reflecting curved surfaces 20B connected with the first reflecting curved surface 20A, and the third reflecting curved surfaces 20C connected with the second reflecting curved surface 20B. The second reflecting curved surface 20B can be an irregular curved surface or a regular curved surface (as shown in FIG. 3), and the third reflecting curved surface 20C can also be an irregular curved surface or a regular curved surface (as shown in FIG. 3).

Fourth Embodiment

Figure 4:
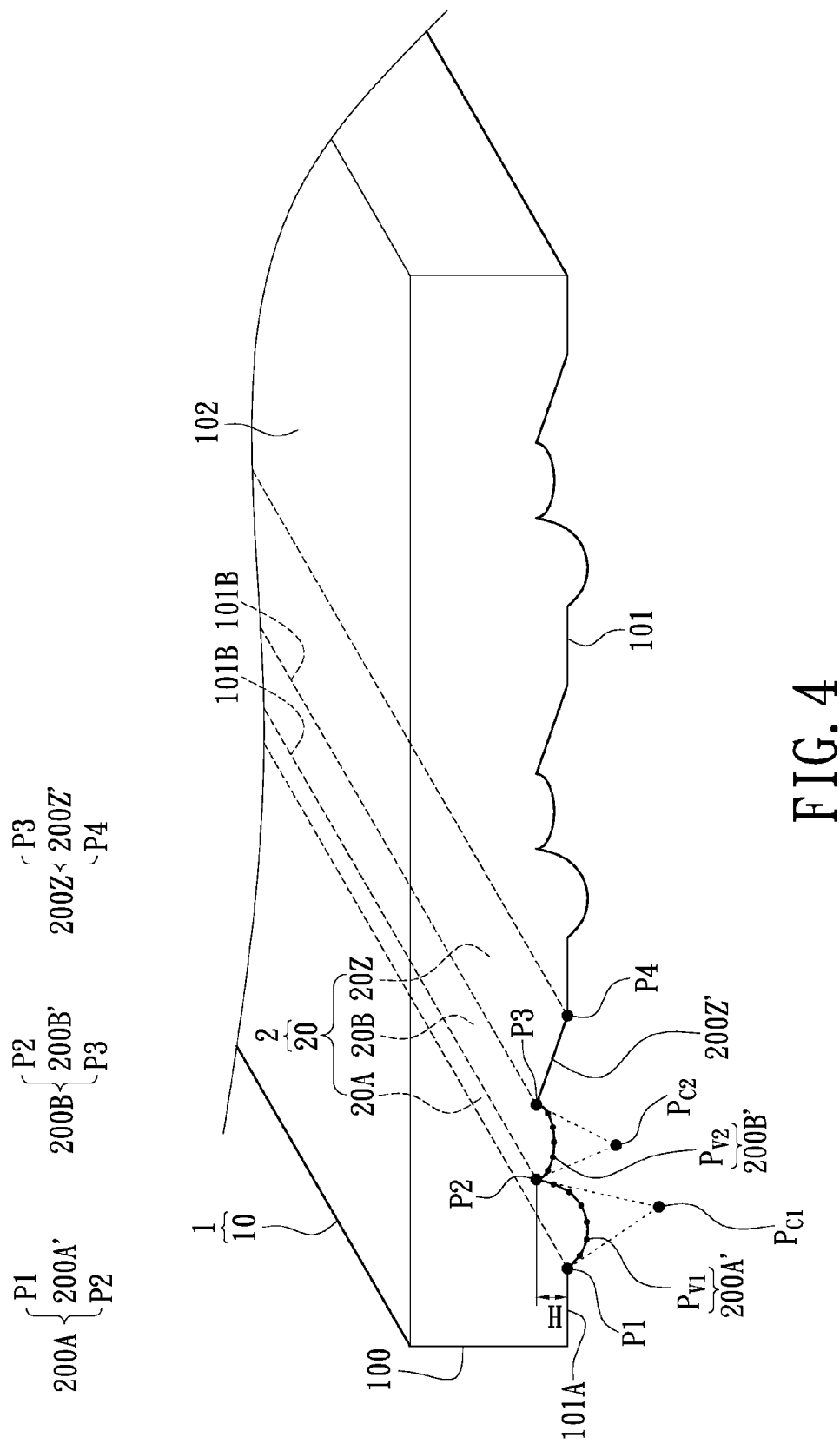
FIG. 4 shows a partial, perspective, schematic view of the light-guiding plate according to the fourth embodiment of the instant disclosure.

Referring to FIG. 4, the fourth embodiment of the instant disclosure provides a light-guiding plate. Comparing FIG. 4 with FIG. 3, the different between the fourth embodiment and the third embodiment is that: in the fourth embodiment, the each reflecting microstructure 20 has a reflecting plane surface 20Z, and the reflecting plane surface 20Z of each reflecting microstructure 20 has a reflecting straight line 200Z shown on the lateral surface thereof. The reflecting straight line 200Z of each reflecting plane surface 20Z is substantially composed of the third base point ($P_3$) as an initial point on the second bottom portion 101B of the light-reflecting surface 101, a fourth base point ($P_4$) as an end point on the first bottom portion 101A of the light-reflecting surface 101, and a straight line track 200Z' straightly connected from the third base point ($P_3$) to the fourth base point ($P_4$). In other words, the reflecting straight lines 200Z of the reflecting plane surfaces 20Z are respectively connected to the second reflecting curved lines 200B of the second reflecting curved surfaces 20B, thus the reflecting plane surfaces 20Z are respectively connected to the second reflecting curved surfaces 20B.

Fifth Embodiment

Figure 5:
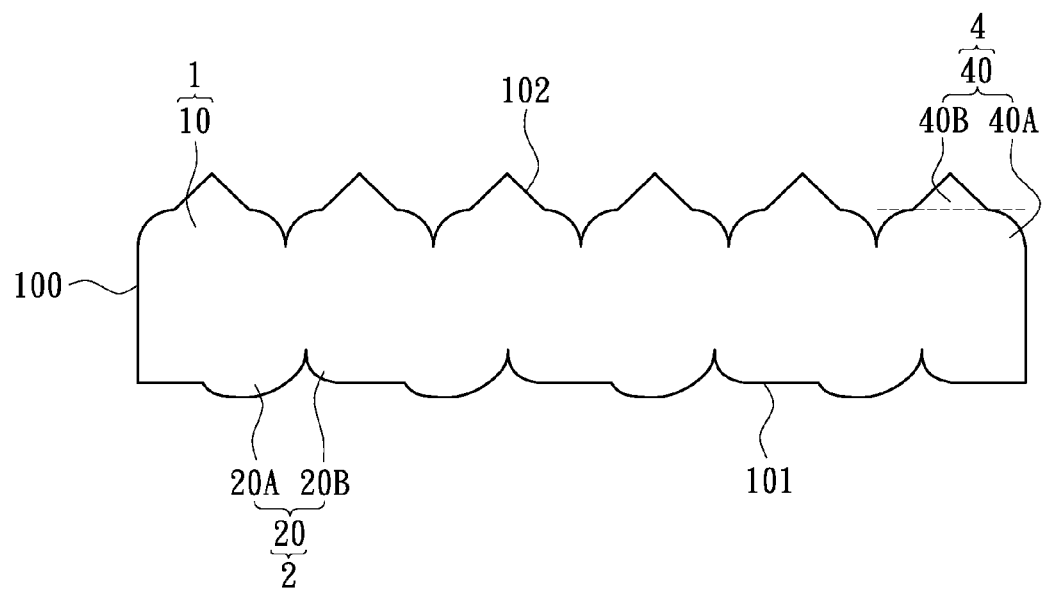
FIG. 5 shows a lateral, schematic view of the light-guiding plate according to the fifth embodiment of the instant disclosure.

Referring to FIG. 5, the fifth embodiment of the instant disclosure provides a light-guiding plate. Comparing FIG. 5 with FIG. 1C, the different between the fifth embodiment and the first embodiment is that: in the fifth embodiment, the light-guiding plate further comprises a light-projecting unit 4 including a plurality of light-projecting microstructures 40 integrally formed on the light-projecting surface 102 of the main body 10. In addition, each light-projecting microstructure 40 includes a light-diffusing portion 40A connected with the main body 10 and a light-converging portion 40B integrally formed on the light-diffusing portion 40A. The dotted line in FIG. 5 is a boundary line between the light-diffusing portion 40A and the light-converging portion 40B.

Sixth Embodiment

Figure 6:
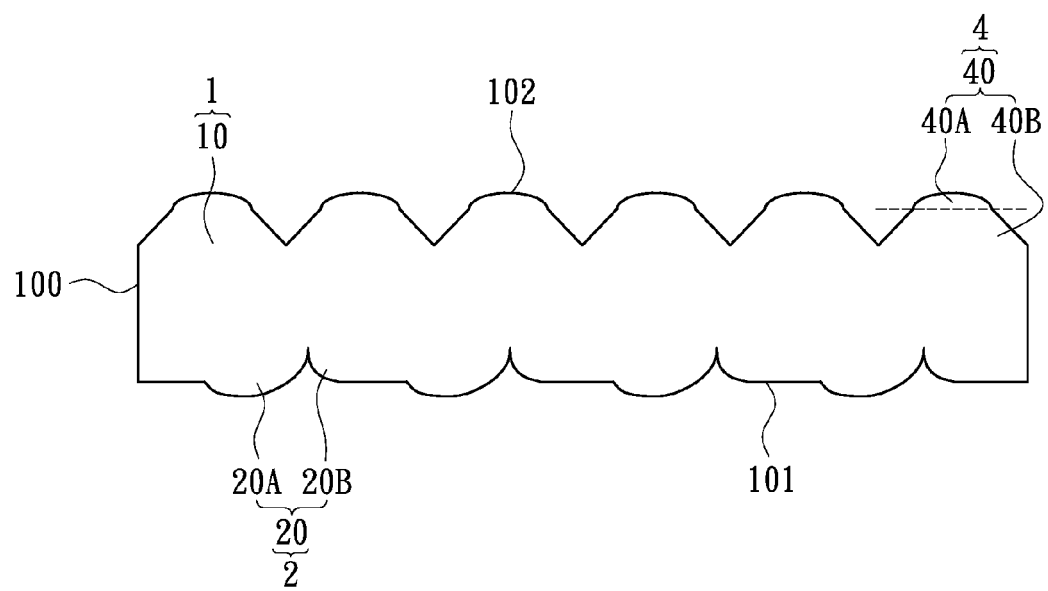
FIG. 6 shows a lateral, schematic view of the light-guiding plate according to the sixth embodiment of the instant disclosure.

Referring to FIG. 6, the sixth embodiment of the instant disclosure provides a light-guiding plate. Comparing FIG. 6 with FIG. 5, the different between the sixth embodiment and the fifth embodiment is that: in the sixth embodiment, each light-projecting microstructure 40 includes a light-converging portion 40B connected with the main body 10 and a light-diffusing portion 40A integrally formed on the light-converging portion 40B.

Seventh Embodiment

Figure 7A:
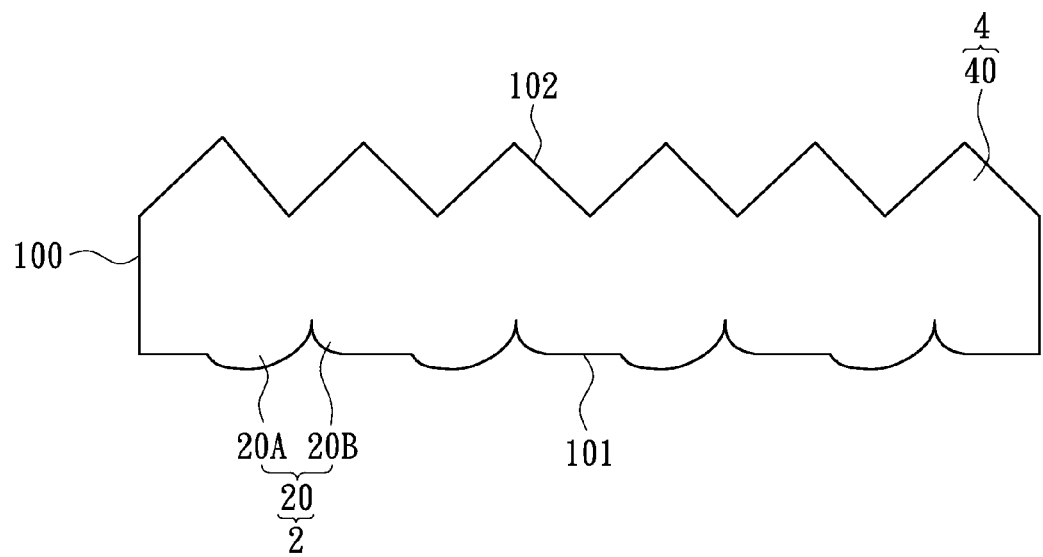
FIG. 7A shows a first, lateral, schematic view of the light-guiding plate according to the seventh embodiment of the instant disclosure.
Figure 7B:
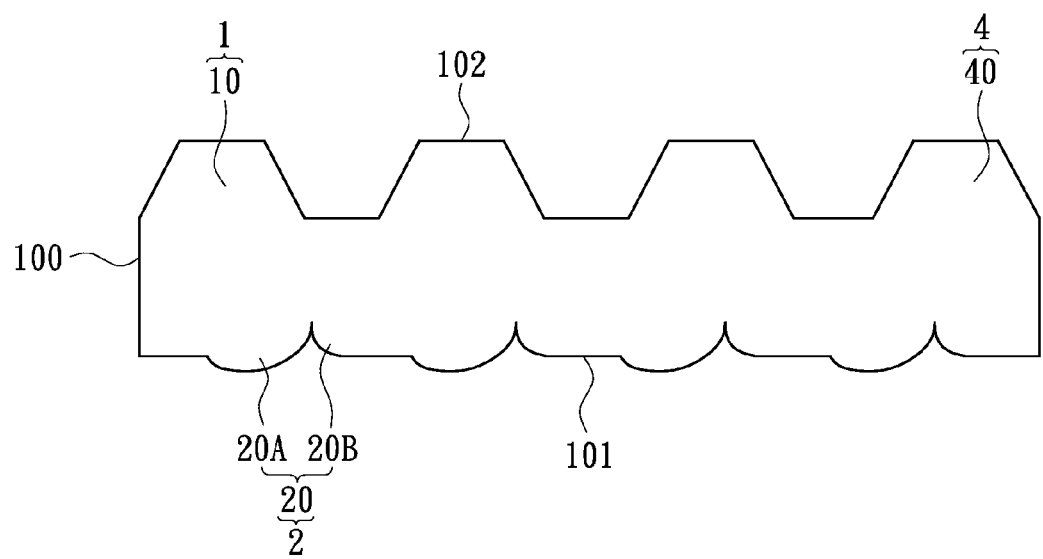
FIG. 7B shows a second, lateral, schematic view of the light-guiding plate according to the seventh embodiment of the instant disclosure.
Figure 7C:
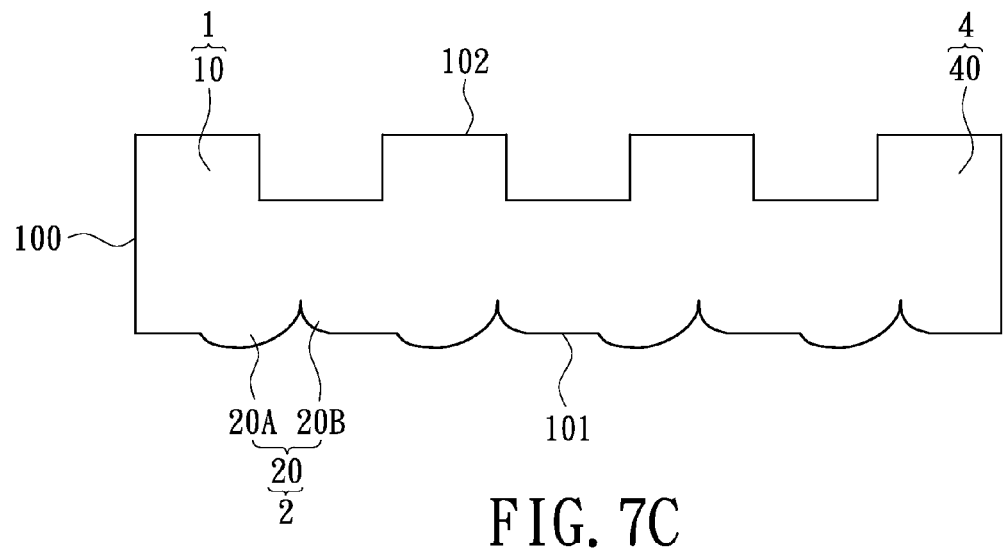
FIG. 7C shows a third, lateral, schematic view of the light-guiding plate according to the seventh embodiment of the instant disclosure.
Figure 7D:
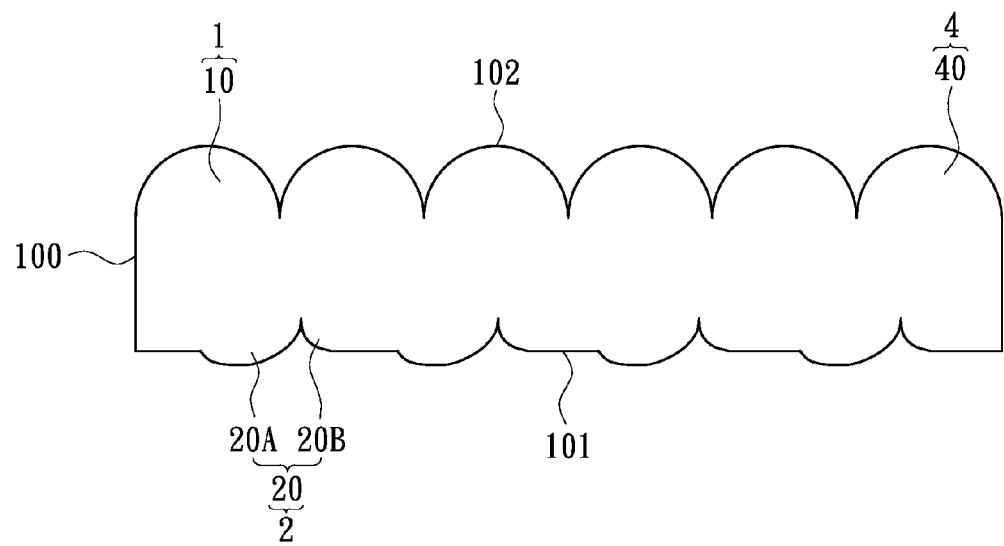
FIG. 7D shows a fourth, lateral, schematic view of the light-guiding plate according to the seventh embodiment of the instant disclosure.
Figure 7E:
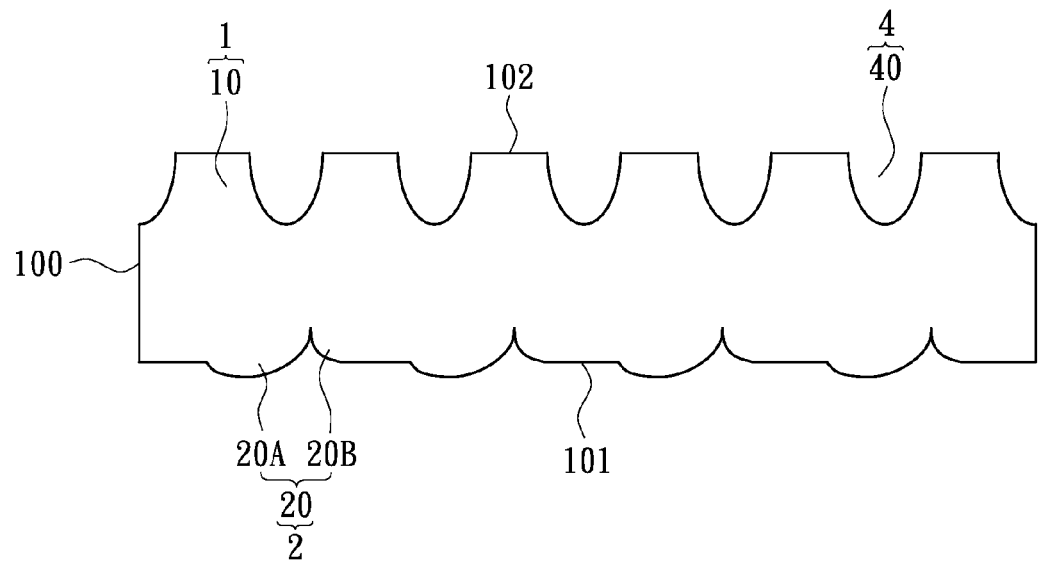
FIG. 7E shows a fifth, lateral, schematic view of the light-guiding plate according to the seventh embodiment of the instant disclosure.

Referring to FIGS. 7A to 7E, the seventh embodiment of the instant disclosure provides a light-guiding plate. Comparing one of FIGS. 7A-7E with FIG. 1C, the different between the seventh embodiment and the first embodiment is that: in the seventh embodiment, the light-guiding plate further comprises a light-projecting unit 4 including a plurality of light-projecting microstructures 40 integrally formed on the light-projecting surface 102 of the main body 10, and each light-projecting microstructure 40 may has a triangular shape (as shown in FIG. 7A), a ladder shape (as shown in FIG. 7B), a square shape (as shown in FIG. 7C), a convex arc shape (as shown in FIG. 7D), a concave arc shape (as shown in FIG. 7E), etc.

Eighth Embodiment

Figure 8:
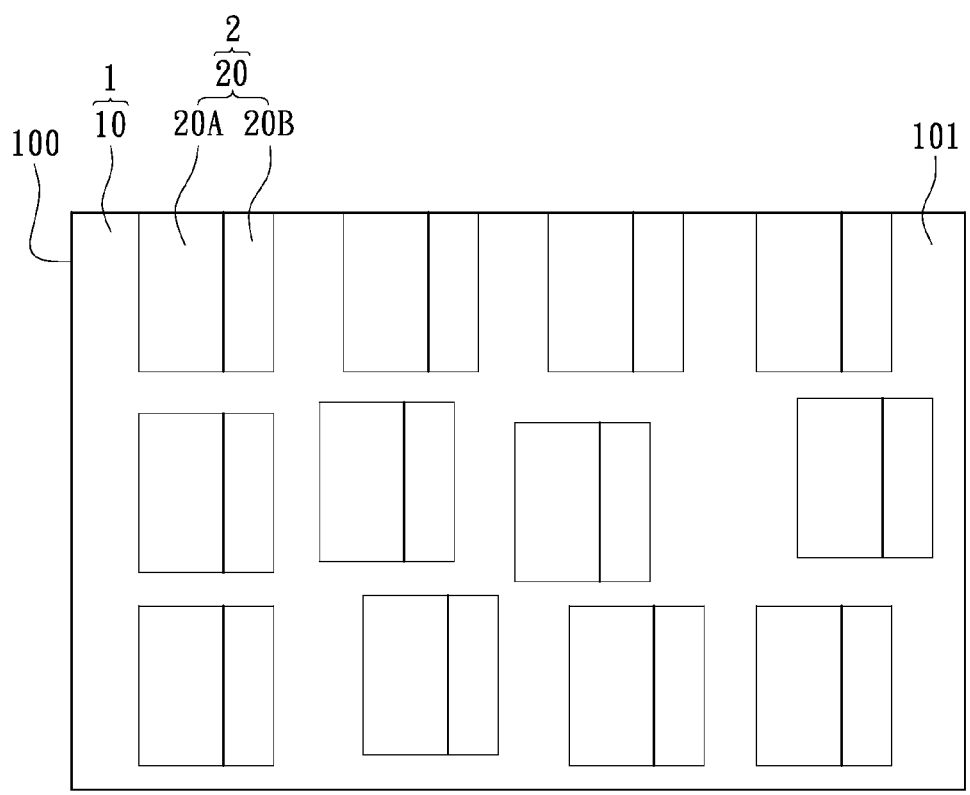
FIG. 8 shows a bottom, schematic view of the light-guiding plate according to the eighth embodiment of the instant disclosure.

Referring to FIG. 8, the eighth embodiment of the instant disclosure provides a light-guiding plate. Comparing FIG. 8 with FIG. 1B, the different between the eighth embodiment and the first embodiment is that: in the eighth embodiment, the reflecting microstructures 20 can be disorderly and integrally formed on the light-reflecting surface 101 of the at last one main body 10.

[Light Shape Curve Diagram]

Referring to FIG. 9, where a light shape curve diagram of different light-projecting angles versus different light-projecting intensities according to different light-guiding plates in FIGS. 1C, 2B, 3, 5, 6, and 7A-7E is shown. The light-converging effect of the light-guiding plates using the light-projecting microstructures 40 (as shown in FIGS. 5, 6 and 7A-7E) is better than that of the light-guiding plates without using the light-projecting microstructures 40 (as shown in FIGS. 1C, 2B and 3). Especially, the light shape curve of the light-guiding plate in FIG. 5 is most smooth to obtain a good light-converging effect. Hence, the projection light generated from the light-guiding plate can obtain a good light shape by adjusting the light-diffusing portion 40A and the light-converging portion 40B.

In conclusion, the light-guiding efficiency and the light usage rate of the positive light source can be effectively increased due to the design of the reflecting microstructures formed on the light-reflecting surface of the main body.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A light-guiding plate, comprising:
a main unit including at least one main body, wherein the at least one main body has a light-receiving surface, a light-reflecting surface, and a light-projecting surface, the light-receiving surface connects to the light-reflecting surface and the light-projecting surface, the light-reflecting surface corresponds to the light-projecting surface, and the light-reflecting surface has a first bottom portion and a second bottom portion separated from the first bottom portion by a predetermined height; and
a reflecting unit including a plurality of reflecting microstructures formed on the light-reflecting surface of the at least one main body, wherein each reflecting microstructure has a first reflecting curved surface, and the first reflecting curved surface of each reflecting microstructure has a first reflecting curved line shown on the lateral surface thereof;
wherein the first reflecting curved line of each first reflecting curved surface is substantially composed of a first base point ($P_1$) as an initial point on the first bottom portion of the light-reflecting surface, a second base point ($P_2$) as an end point on the second bottom portion of the light-reflecting surface, and a first curve track connected from the first base point ($P_1$) to the second base point ($P_2$) and passing through a plurality of first trajectory points ($P_{V1}$), wherein the first reflecting curved line of each first reflecting curved surface has a first control point ($P_{C1}$) separated from the first base point ($P_1$) by a first predetermined distance and from the second base point ($P_2$) by a second predetermined distance, and the first curve track of the first reflecting curved line of each first reflecting curved surface is disposed within a triangular area surrounded by the first base point ($P_1$), the second base point ($P_2$), and the first control point ($P_{C1}$);
wherein the relationship among $\overrightarrow{P_1P_{V1}}$, $\overrightarrow{P_1P_{C1}}$, and $\overrightarrow{P_1P_2}$ for the first reflecting curved line of each first reflecting curved surface conforms to the following formula:

$$\overrightarrow{P_1P_{V1}} = \left[\frac{2AV(1-V)}{1+2(A-1)V+2(1-A)V^2}\right]\overrightarrow{P_1P_{C1}} + \left[\frac{V^2}{1+2(A-1)V+2(1-A)V^2}\right]\overrightarrow{P_1P_2},$$

wherein the label A is defined as a weighting factor substantially between 0.1 and 10, and the label V is defined as a parameter substantially between 0 and 1.

2. The light-guiding plate as claimed in claim 1, wherein the at least one main body is a light-permitting body, the light-receiving surface is formed on one lateral side of the light-permitting body, and the light-reflecting surface and the light-projecting surface are respectively formed on a bottom side and a top side of the light-permitting body.

3. The light-guiding plate as claimed in claim 1, wherein each reflecting microstructure is a continuous extending structure, and the reflecting microstructures are integrally formed on the light-reflecting surface of the at last one main body in parallel.

4. The light-guiding plate as claimed in claim 1, wherein the reflecting microstructures are disorderly and integrally formed on the light-reflecting surface of the at last one main body.

5. The light-guiding plate as claimed in claim 1, further comprising a light-projecting unit including a plurality of light-projecting microstructures integrally formed on the light-projecting surface of the at least one main body, wherein each light-projecting microstructure includes a light-diffusing portion connected with the at least one main body and a light-converging portion integrally formed on the light-diffusing portion.

6. The light-guiding plate as claimed in claim 1, further comprising a light-projecting unit including a plurality of light-projecting microstructures integrally formed on the light-projecting surface of the at least one main body, wherein each light-projecting microstructure includes a light-converging portion connected with the at least one main body and a light-diffusing portion integrally formed on the light-converging portion.

7. The light-guiding plate as claimed in claim 1, wherein each reflecting microstructure has a second reflecting curved surface, and the second reflecting curved surface of each reflecting microstructure has a second reflecting curved line shown on the lateral surface thereof, wherein the second reflecting curved line of each second reflecting curved surface is substantially composed of the second base point ($P_2$) as an initial point on the second bottom portion of the light-reflecting surface, a third base point ($P_3$) as an end point on the first bottom portion of the light-reflecting surface, and a second curve track connected from the second base point ($P_2$) to the third base point ($P_3$) and passing through a plurality of second trajectory points ($P_{V2}$).

8. The light-guiding plate as claimed in claim 7, wherein the second reflecting curved line of each second reflecting curved surface has a second control point ($P_{C2}$) separated from the second base point ($P_2$) by a first predetermined distance and from the third base point ($P_3$) by a second predetermined distance, and the second curve track of the second reflecting curved line of each second reflecting curved surface is disposed within a triangular area surrounded by the second base point ($P_2$), the third base point ($P_3$), and the second control point ($P_{C2}$), wherein the relationship among $\overrightarrow{P_3P_{V2}}$, $\overrightarrow{P_3P_{C2}}$ and $\overrightarrow{P_3P_2}$ for the second reflecting curved line of each second reflecting curved surface conforms to the following formula:

$$\overrightarrow{P_3P_{V2}} = \left[\frac{2AV(1-V)}{1+2(A-1)V+2(1-A)V^2}\right]$$

$$\overrightarrow{P_3P_{C2}} + \left[\frac{V^2}{1+2(A-1)V+2(1-A)V^2}\right]\overrightarrow{P_3P_2},$$

wherein the label A is defined as a weighting factor substantially between 0.1 and 10, and the label V is defined as a parameter substantially between 0 and 1, wherein the second reflecting curved lines of the second reflecting curved surfaces are respectively connected to the first reflecting curved lines of the first reflecting curved surfaces, thus the second reflecting curved surfaces are respectively connected to the first reflecting curved surfaces.

9. The light-guiding plate as claimed in claim 1, wherein each reflecting microstructure has a reflecting plane surface, and the reflecting plane surface of each reflecting microstructure has a reflecting straight line shown on the lateral surface thereof, wherein the reflecting straight line of each reflecting plane surface is substantially composed of the second base point ($P_2$) as an initial point on the second bottom portion of the light-reflecting surface, a third base point ($P_3$) as an end point on the first bottom portion of the light-reflecting surface, and a straight line track straightly connected from the second base point ($P_2$) to the third base point ($P_3$).

10. The light-guiding plate as claimed in claim 9, wherein the reflecting straight lines of the reflecting plane surfaces are respectively connected to the first reflecting curved lines of the first reflecting curved surfaces, thus the reflecting plane surfaces are respectively connected to the first reflecting curved surfaces.

11. The light-guiding plate as claimed in claim 1, wherein each reflecting microstructure has a second reflecting curved surface, and the second reflecting curved surface of each reflecting microstructure has a second reflecting curved line shown on the lateral surface thereof, wherein the second reflecting curved line of each second reflecting curved surface is substantially composed of the second base point ($P_2$) as an initial point on the second bottom portion of the light-reflecting surface, a third base point ($P_3$) as an end point on the second bottom portion of the light-reflecting surface, and a second curve track connected from the second base point ($P_2$) to the third base point ($P_3$) and passing through a plurality of second trajectory points ($P_{V2}$).

12. The light-guiding plate as claimed in claim 11, wherein the each reflecting microstructure has a reflecting plane surface, and the reflecting plane surface of each reflecting microstructure has a reflecting straight line shown on the lateral surface thereof, wherein the reflecting straight line of each reflecting plane surface is substantially composed of the third base point ($P_3$) as an initial point on the second bottom portion of the light-reflecting surface, a fourth base point ($P_4$) as an end point on the first bottom portion of the light-reflecting surface, and a straight line track straightly connected from the third base point ($P_3$) to the fourth base point ($P_4$).

13. The light-guiding plate as claimed in claim 12, wherein the reflecting straight lines of the reflecting plane surfaces are respectively connected to the second reflecting curved lines of the second reflecting curved surfaces, thus the reflecting plane surfaces are respectively connected to the second reflecting curved surfaces.

14. The light-guiding plate as claimed in claim 11, wherein each reflecting microstructure has a third reflecting curved surface, and the third reflecting curved surface of each reflecting microstructure has a third reflecting curved line shown on the lateral surface thereof, wherein the third reflecting curved line of each third reflecting curved surface is substantially composed of the third base point ($P_3$) as an initial point on the second bottom portion of the light-reflecting surface, a fourth base point ($P_4$) as an end point on the first bottom portion of the light-reflecting surface, and a third curve track connected from the third base point ($P_3$) to the fourth base point ($P_4$) and passing through a plurality of third trajectory points ($P_{V3}$).

15. The light-guiding plate as claimed in claim 14, wherein the second reflecting curved line of each second reflecting curved surface has a second control point ($P_{C2}$) separated from the second base point ($P_2$) by a first predetermined distance and from the third base point ($P_3$) by a second predetermined distance, and the second curve track of the second reflecting curved line of each second reflecting curved surface is disposed within a triangular area surrounded by the second base point ($P_2$), the third base point ($P_3$), and the second control point ($P_{C2}$), wherein the relationship among $\overrightarrow{P_3P_{V2}}$, $\overrightarrow{P_3P_{C2}}$, and $\overrightarrow{P_3P_2}$ for the second reflecting curved line of each second reflecting curved surface conforms to the following formula:

$$\overrightarrow{P_3P_{V2}} = \left[\frac{2AV(1-V)}{1+2(A-1)V+2(1-A)V^2}\right]$$

$$\overrightarrow{P_3P_{C2}} + \left[\frac{V^2}{1+2(A-1)V+2(1-A)V^2}\right]\overrightarrow{P_3P_2},$$

wherein the label A is defined as a weighting factor substantially between 0.1 and 10, and the label V is defined as a parameter substantially between 0 and 1, wherein the second reflecting curved lines of the second reflecting curved surfaces are respectively connected to the first reflecting curved lines of the first reflecting curved surfaces, thus the second reflecting curved surfaces are respectively connected to the first reflecting curved surfaces.

16. The light-guiding plate as claimed in claim 15, wherein the third reflecting curved line of each third reflecting curved surface has a third control point ($P_{C3}$) separated from the third base point ($P_3$) by a first predetermined distance and from the fourth base point ($P_4$) by a second predetermined distance, and the third curve track of the third reflecting curved line of each third reflecting curved surface is disposed within a triangular area surrounded by the third base point ($P_3$), the fourth base point ($P_4$), and the third control point ($P_{C3}$), wherein the relationship among $\overrightarrow{P_4P_{V3}}$, $\overrightarrow{P_4P_{C3}}$, and $\overrightarrow{P_4P_3}$ for the third reflecting curved line of each third reflecting curved surface conforms to the following formula:

$$\overrightarrow{P_4P_{V3}} = \left[\frac{2AV(1-V)}{1+2(A-1)V+2(1-A)V^2}\right]$$

$$\overrightarrow{P_4P_{C3}} + \left[\frac{V^2}{1+2(A-1)V+2(1-A)V^2}\right]\overrightarrow{P_4P_3},$$

wherein the label A is defined as a weighting factor substantially between 0.1 and 10, and the label V is defined as a parameter substantially between 0 and 1, wherein the third reflecting curved lines of the third reflecting curved surfaces are respectively connected to the second reflecting curved lines of the second reflecting curved surfaces, thus the third reflecting curved surfaces are respectively connected to the second reflecting curved surfaces.

17. A backlight module, comprising:
a main unit including at least one main body, wherein the at least one main body has a light-receiving surface, a light-reflecting surface, and a light-projecting surface, the light-receiving surface connects to the light-reflecting surface and the light-projecting surface, the light-reflecting surface corresponds to the light-projecting surface, and the light-reflecting surface has a first bottom portion and a second bottom portion separated from the first bottom portion by a predetermined height;
a reflecting unit including a plurality of reflecting microstructures formed on the light-reflecting surface of the at least one main body, wherein each reflecting microstructure has a first reflecting curved surface, and the first reflecting curved surface of each reflecting microstructure has a first reflecting curved line shown on the lateral surface thereof; and
a light-emitting unit disposed adjacent to one lateral side of the at least one main body and facing the light-receiving surface of the at least one main body;
wherein the first reflecting curved line of each first reflecting curved surface is substantially composed of a first base point ($P_1$) as an initial point on the first bottom portion of the light-reflecting surface, a second base point ($P_2$) as an end point on the second bottom portion of the light-reflecting surface, and a first curve track connected from the first base point ($P_1$) to the second base point ($P_2$) and passing through a plurality of first trajectory points ($P_{V1}$), wherein the first reflecting curved line of each first reflecting curved surface has a first control point ($P_{C1}$) separated from the first base point ($P_1$) by a first predetermined distance and from the second base point ($P_2$) by a second predetermined distance, and the first curve track of the first reflecting curved line of each first reflecting curved surface is disposed within a triangular area surrounded by the first base point ($P_1$), the second base point ($P_2$), and the first control point ($P_{C1}$);
wherein the relationship among $\overrightarrow{P_1P_{V1}}$, $\overrightarrow{P_1P_{C1}}$, and $\overrightarrow{P_1P_2}$ for the first reflecting curved line of each first reflecting curved surface conforms to the following formula:

$$\overrightarrow{P_1P_{V1}} = \left[\frac{2AV(1-V)}{1+2(A-1)V+2(1-A)V^2}\right]$$

$$\overrightarrow{P_1P_{C1}} + \left[\frac{V^2}{1+2(A-1)V+2(1-A)V^2}\right]\overrightarrow{P_1P_2},$$

wherein the label A is defined as a weighting factor substantially between 0.1 and 10, and the label V is defined as a parameter substantially between 0 and 1.

18. The backlight module as claimed in claim 17, wherein each reflecting microstructure has a second reflecting curved surface, and the second reflecting curved surface of each reflecting microstructure has a second reflecting curved line shown on the lateral surface thereof, wherein the second reflecting curved line of each second reflecting curved surface is substantially composed of the second base point ($P_2$) as an initial point on the second bottom portion of the light-reflecting surface, a third base point ($P_3$) as an end point on the first bottom portion of the light-reflecting surface, and a second curve track connected from the second base point ($P_2$) to the third base point ($P_3$) and passing through a plurality of second trajectory points ($P_{V2}$), wherein the second reflecting curved line of each second reflecting curved surface has a second control point ($P_{C2}$) separated from the second base point ($P_2$) by a first predetermined distance and from the third base point ($P_3$) by a second predetermined distance, and the second curve track of the second reflecting curved line of each second reflecting curved surface is disposed within a triangular area surrounded by the second base point ($P_2$), the third base point ($P_3$), and the second control point ($P_{C2}$), wherein the relationship among $\overrightarrow{P_3P_{V2}}$, $\overrightarrow{P_3P_{C2}}$, and $\overrightarrow{P_3P_2}$ for the second reflecting curved line of each second reflecting curved surface conforms to the following formula:

$$\overrightarrow{P_3P_{V2}} = \left[\frac{2AV(1-V)}{1+2(A-1)V+2(1-A)V^2}\right]$$

$$\overrightarrow{P_3P_{C2}} + \left[\frac{V^2}{1+2(A-1)V+2(1-A)V^2}\right]\overrightarrow{P_3P_2},$$

wherein the label A is defined as a weighting factor substantially between 0.1 and 10, and the label V is defined as a parameter substantially between 0 and 1, wherein the second reflecting curved lines of the second reflecting curved surfaces are respectively connected to the first reflecting curved lines of the first reflecting curved surfaces, thus the second reflecting curved surfaces are respectively connected to the first reflecting curved surfaces.

19. The backlight module as claimed in claim 17, wherein each reflecting microstructure has a second reflecting curved surface, and the second reflecting curved surface of each reflecting microstructure has a second reflecting curved line shown on the lateral surface thereof, wherein the second reflecting curved line of each second reflecting curved surface is substantially composed of the second base point ($P_2$) as an initial point on the second bottom portion of the light-reflecting surface, a third base point ($P_3$) as an end point on the second bottom portion of the light-reflecting surface, and a second curve track connected from the second base point ($P_2$) to the third base point ($P_3$) and passing through a plurality of second trajectory points ($P_{V2}$), wherein the second reflecting curved line of each second reflecting curved surface has a second control point ($P_{C2}$) separated from the second base point ($P_2$) by a first predetermined distance and from the third base point ($P_3$) by a second predetermined distance, and the second curve track of the second reflecting curved line of each second reflecting curved surface is disposed within a triangular area surrounded by the second base point ($P_2$), the third base point ($P_3$), and the second control point ($P_{C2}$), wherein the relationship among $\overrightarrow{P_3P_{V2}}$, $\overrightarrow{P_3P_{C2}}$, and $\overrightarrow{P_3P_2}$ for the second reflecting curved line of each second reflecting curved surface conforms to the following formula:

$$\overrightarrow{P_3P_{V2}} = \left[\frac{2AV(1-V)}{1+2(A-1)V+2(1-A)V^2}\right]$$
$$\overrightarrow{P_3P_{C2}} + \left[\frac{V^2}{1+2(A-1)V+2(1-A)V^2}\right]\overrightarrow{P_3P_2},$$

wherein the label A is defined as a weighting factor substantially between 0.1 and 10, and the label V is defined as a parameter substantially between 0 and 1, wherein the second reflecting curved lines of the second reflecting curved surfaces are respectively connected to the first reflecting curved lines of the first reflecting curved surfaces, thus the second reflecting curved surfaces are respectively connected to the first reflecting curved surfaces.

20. The backlight module as claimed in claim 19, wherein each reflecting microstructure has a third reflecting curved surface, and the third reflecting curved surface of each reflecting microstructure has a third reflecting curved line shown on the lateral surface thereof, wherein the third reflecting curved line of each third reflecting curved surface is substantially composed of the third base point ($P_3$) as an initial point on the second bottom portion of the light-reflecting surface, a fourth base point ($P_4$) as an end point on the first bottom portion of the light-reflecting surface, and a third curve track connected from the third base point ($P_3$) to the fourth base point ($P_4$) and passing through a plurality of third trajectory points ($P_{V3}$), wherein the third reflecting curved line of each third reflecting curved surface has a third control point ($P_{C3}$) separated from the third base point ($P_3$) by a first predetermined distance and from the fourth base point ($P_4$) by a second predetermined distance, and the third curve track of the third reflecting curved line of each third reflecting curved surface is disposed within a triangular area surrounded by the third base point ($P_3$), the fourth base point ($P_4$), and the third control point ($P_{C3}$), wherein the relationship among $\overrightarrow{P_4P_{V3}}$, $\overrightarrow{P_4P_{C3}}$, and $\overrightarrow{P_4P_3}$ for the third reflecting curved line of each third reflecting curved surface conforms to the following formula:

$$\overrightarrow{P_4P_{V3}} = \left[\frac{2AV(1-V)}{1+2(A-1)V+2(1-A)V^2}\right]$$
$$\overrightarrow{P_4P_{C3}} + \left[\frac{V^2}{1+2(A-1)V+2(1-A)V^2}\right]\overrightarrow{P_4P_3},$$

wherein the label A is defined as a weighting factor substantially between 0.1 and 10, and the label V is defined as a parameter substantially between 0 and 1, wherein the third reflecting curved lines of the third reflecting curved surfaces are respectively connected to the second reflecting curved lines of the second reflecting curved surfaces, thus the third reflecting curved surfaces are respectively connected to the second reflecting curved surfaces.

* * * * *